(12) United States Patent  (10) Patent No.: US 7,580,092 B2
Heo  (45) Date of Patent: Aug. 25, 2009

(54) LIQUID CRYSTAL DISPLAY DEVICE AND METHOD FOR FABRICATING THE SAME

(75) Inventor: Seung-Ho Heo, Gyeongsangnam-do (KR)

(73) Assignee: LG Display Co., Ltd., Seoul (KR)

( * ) Notice: Subject to any disclaimer, the term of this patent is extended or adjusted under 35 U.S.C. 154(b) by 478 days.

(21) Appl. No.: 11/476,805

(22) Filed: Jun. 29, 2006

(65) Prior Publication Data

US 2007/0146582 A1  Jun. 28, 2007

(30) Foreign Application Priority Data

Dec. 27, 2005 (KR) ...................... 10-2005-0131013

(51) Int. Cl.
G02F 1/1335 (2006.01)
(52) U.S. Cl. ........................... 349/106; 349/96; 349/104
(58) Field of Classification Search ........... 349/96–104, 349/106, 113

See application file for complete search history.

(56) References Cited

U.S. PATENT DOCUMENTS

2002/0039166 A1   4/2002  Song
2005/0270446 A1*  12/2005  Kim et al. .................... 349/110

FOREIGN PATENT DOCUMENTS

| CN | 1354383 A | 6/2002 |
| JP | 09251162 A | 9/1997 |
| JP | 2000-10122 A | 1/2000 |
| KR | 1020030093472 A | 12/2003 |

OTHER PUBLICATIONS

Lueder, Ernest, Liquid Crystal Displays, Chichester [u.a.]: Wiley, 2001 (Repr. 2005) (Wiley-SID series in display technology). ISBN: 0-471-49029-6.

* cited by examiner

*Primary Examiner*—Kevin S Wood
(74) *Attorney, Agent, or Firm*—Holland & Knight LLP

(57) ABSTRACT

A color filter substrate includes a transparent substrate, a black matrix arranged on the transparent substrate in horizontal and vertical directions along boundaries of pixel regions, the black matrix including a reflection layer on a surface thereof, and a color filter formed on the black matrix.

10 Claims, 3 Drawing Sheets

LIQUID CRYSTAL DISPLAY DEVICE AND METHOD FOR FABRICATING THE SAME

The present invention claims the benefit of Korean Patent Application No. P2005-0131013 filed in Korea on Dec. 27, 2005, which is hereby incorporated by reference in its entirety.

BACKGROUND OF THE INVENTION

1. Field of the Invention

The present invention relates to a display device, and more particularly, to a liquid crystal display device and a method for fabricating the same. Although the present invention is suitable for a wide scope of applications, it is particularly suitable for enhancing the brightness of a liquid crystal display device.

2. Description of the Related Art

Various types of portable electronic devices, such as mobile phones, personal digital assistants (PDA), and note book computers are now in use because of their small size, light weight, and low power consumption. Flat panel display devices, such as liquid crystal displays (LCDs), plasma display panels (PDPs), field emission displays (FEDs), and vacuum fluorescent displays (VFDs), have been developed for such portable electronic devices. Of these flat panel display devices, the LCDs are currently in mass production because of their simple driving scheme and superior image quality.

FIG. 1 is a cross-sectional view showing an LCD device 1 in accordance with the related art. As shown in FIG. 1, the LCD device 1 includes a lower substrate 5, an upper substrate 3, and a liquid crystal layer 7 formed between the lower substrate 5 and the upper substrate 3. A driving device array of a plurality of pixels is formed on the lower substrate 5. A switching device 9, such as a thin film transistor (TFT) is formed in each pixel. A pixel electrode 6 connected to the TFT is formed on the lower substrate 5.

A black matrix 8 and a color filter layer 2 are positioned on the upper substrate 3 for implementing the display of colors. A common electrode 4 is formed on the upper substrate 3. An alignment layer for aligning liquid crystal molecules of the liquid crystal layer 7 is provided on the lower substrate 5.

The lower substrate 5 and the upper substrate 3 are attached to each other by a sealant (not shown) formed at the periphery of the substrates. A constant cell gap is maintained by a spacer (not shown) positioned between the lower substrate 5 and the upper substrate 3. Also, the liquid crystal layer 7 is formed between the lower substrate 5 and the upper substrate 3. The TFT switches an electric field between the common electrode 4 and the pixel electrode 6. The electric field reorients the liquid crystal molecules in the liquid crystal layer to control light passing through the liquid crystal layer, thereby displaying information.

The driving device array on the lower substrate 5 is formed by a driving device array process, and a color filter on the upper substrate 3 is formed by a color filter process. A spacer forming process and a liquid crystal layer forming process are then performed. Lastly, the lower substrate 5 and the upper substrate 3 are sealed together with a sealing process.

In the driving device array substrate process, a plurality of gate lines and data lines are formed first for defining pixel regions on the lower substrate 5. Then, a thin film transistor 9 connected to the gate lines and the data lines is formed in each pixel region. Then, the pixel electrode 6 connected to the thin film transistor for driving the liquid crystal layer by receiving a signal through the thin film transistor is formed in each pixel region.

In the color filter substrate process, the black matrix 8 is formed first on the upper substrate 3. Then, the color filter 2 is formed for implementing red (R), green (G), and blue (B) colors. The common electrode 4 is then formed on the color filter layer 2.

In the related art LCD device, light is supplied from a backlight provided at a lower surface of the lower substrate 5. An image is displayed by controlling an amount of light passing through the liquid crystal layer from the backlight. However, light incident on the black matrix 8 from the backlight is absorbed by the black matrix 8. Accordingly, light incident on the black matrix 8 is lost and not used in displaying an image.

SUMMARY OF THE INVENTION

Accordingly, the present invention is directed to a liquid crystal display device and a method for fabricating the same that substantially obviate one or more of the problems due to limitations and disadvantages of the related art.

An object of the present invention is to provide a liquid crystal display device and a method for fabricating the same having enhanced brightness.

Another object of the present invention is to provide a liquid crystal display device and a method for fabricating the same that increases the utilization of light from a backlight.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a color filter substrate including a transparent substrate, a black matrix arranged on the transparent substrate in horizontal and vertical directions along boundaries of pixel regions, the black matrix having a reflection layer on a surface thereof, and a color filter formed on the black matrix.

In another aspect, a liquid crystal display device includes a first substrate and a second substrate, gate lines formed on the first substrate in a first direction, data lines formed on the first substrate in a second direction perpendicular to the first direction, a switching device formed adjacent to each crossing of the gate lines and the data lines, a black matrix formed on the second substrate, the black matrix including a reflection layer on a surface thereof, a color filter formed on the black matrix, and a liquid crystal layer formed between the first substrate and the second substrate.

In another aspect, a method for fabricating an liquid crystal display device includes providing a transparent substrate, forming an organic pattern having a triangular shape on the transparent substrate, forming a reflection layer on a surface of the organic pattern, and forming a color filter layer on the transparent substrate.

In yet another aspect, a method for fabricating an liquid crystal display device includes providing a first substrate having a thin film transistor array with pixel regions, providing a second substrate on which a black matrix and a color filter are formed, the black matrix arranged on the second substrate in horizontal and vertical directions along boundaries of the pixel regions, and includes a reflection layer on a surface thereof facing the second substrate, and forming a liquid crystal layer between the first substrate and the second substrate It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 2A and 2B are schematic views showing an LCD device according to an embodiment of the present invention in which FIG. 2A is a plan view and FIG. 2B is a cross-sectional view taken along line I-I of FIG. 2A.

DETAILED DESCRIPTION OF THE PREFERRED EMBODIMENTS

Reference will now be made in detail to the preferred embodiments of the present invention, examples of which are illustrated in the accompanying drawings. Hereinafter, a liquid crystal display (LCD) device and a method for fabricating the same according to the present invention will be explained in more detail with reference to the attached drawings.

Figure 1:
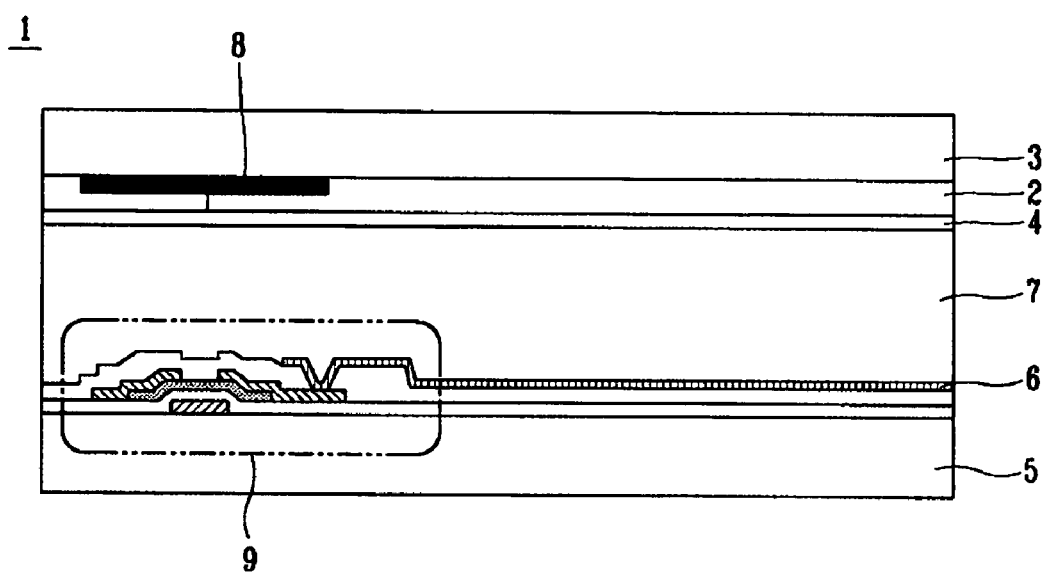
FIG. 1 is a cross-sectional view showing an LCD device in accordance with the related art.
Figure 2A:
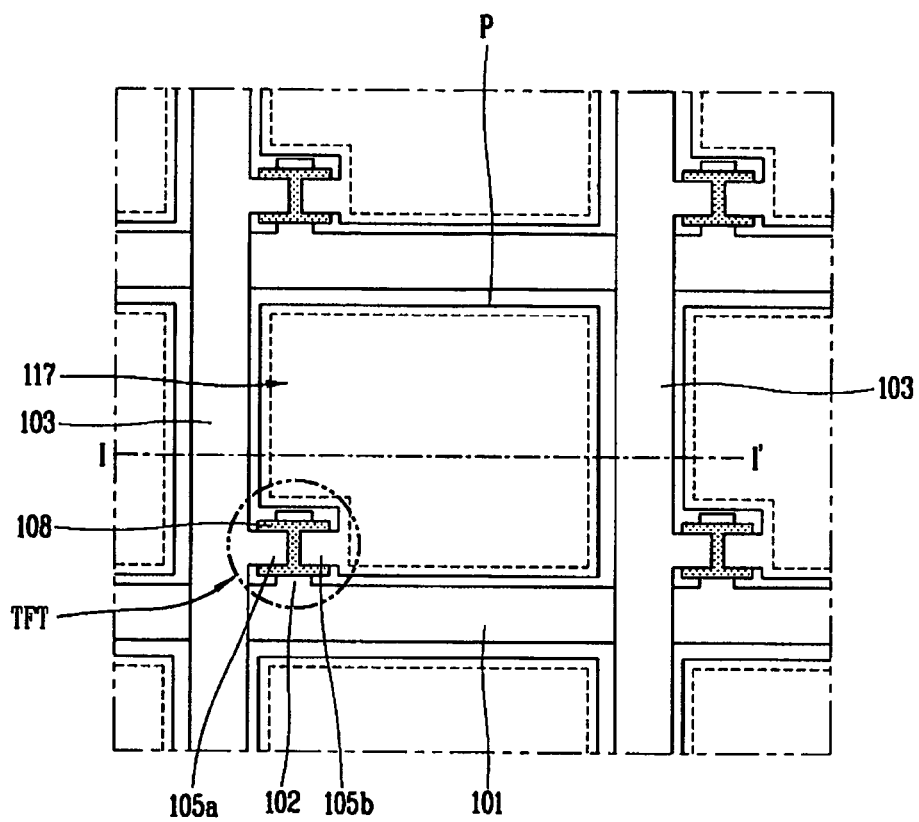
Figure 2B:
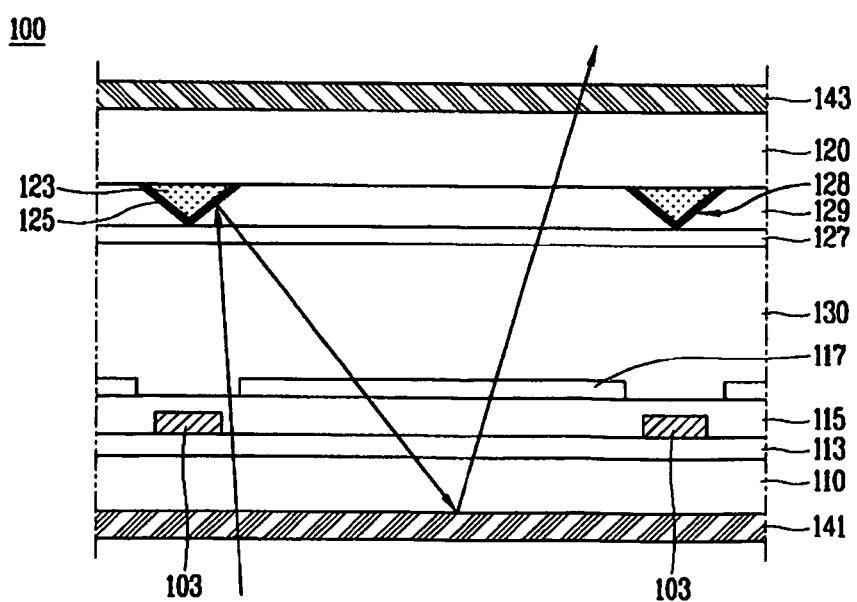

FIGS. 2A and 2B are schematic views showing an LCD device according to an embodiment of the present invention in which FIG. 2A is a plan view and FIG. 2B is a cross-sectional view taken along line I-I of FIG. 2A. As shown in FIGS. 2A and 2B, an LCD device 100 according to an embodiment of the present invention includes a first substrate 110, a second substrate 120, and a liquid crystal layer 130 formed between inside surfaces of the first substrate 110 and the second substrate 120. A first polarizer 141 and a second polarizer 143 are respectively attached to outside surfaces of the first substrate 110 and the second substrate 120. A contact surface of the first polarizer 141 to the rear surface of the first substrate 110 reflects light.

A plurality of gate lines 101 are arranged on the first substrate 110 in a first direction, and a plurality of data lines 103 are arranged to be perpendicular to the gate lines 101 in a second direction to define each pixel region P. A pixel electrode 117 is formed in each pixel region P. A switching device, such as a thin film transistor (TFT) 102, is electrically connected to the pixel electrode 117 for switching a data signal to the pixel. The TFT 102 is formed in each pixel adjacent to where the gate line 101 and the data line 103 for a pixel cross each other. The TFT 102 includes a gate electrode 102 formed from the gate line 101, an active layer 108 formed on the gate electrode, a gate insulating layer 113 interposed between the gate electrode 102 and the active layer 108, and source/drain electrodes 105a and 105b formed on the active layer 108. The gate insulating layer 113 is deposited over the entire surface of the first substrate 110. A passivation layer 115 is formed over the TFT. The drain electrode 105b is electrically connected to the pixel electrode 117, which is on the passivation layer 115.

A black matrix 128 for preventing a light leakage, a color filter 129, and a common electrode 127 are formed on the second substrate 120, which is transparent. The black matrix 128 includes an organic pattern 123 having a tapered or triangular rib structure, and a reflection layer 125 formed on two sides of the triangular rib pattern facing the first substrate 110. The black matrix 128 is arranged on the second substrate 120 in horizontal and vertical directions along boundaries of the plurality of pixel regions.

The black matrix 128 in an embodiment of the present invention not only prevents light leakage but also reflects light incident thereon into adjacent pixel regions P. The reflected light incident into the pixel regions P is re-reflected by the first polarizer 141 attached to the lower surface of the first substrate 110, thereby enhancing brightness of the LCD device and increasing utilization of the light from the backlight. The black matrix 128 reflects light incident thereon to adjacent pixel regions with an inclined reflective surface 125. The reflective inclined surface can be linear or curved. As shown by the arrow in FIG. 2B, light incident onto the black matrix 128 is reflected onto the pixel region P by the reflection layer 125. Then, the reflected light is re-reflected by the first polarizer 141 formed at the lower surface of the first substrate 110, thereby enhancing brightness of the LCD device and increasing utilization of the light from the backlight.

When light is supplied to the LCD device from a backlight (not shown) provided at a lower surface of the first substrate 110, the liquid crystal layer 130 controls an optical transmittance by an electric field applied between the common electrode 127 and the pixel electrode 117. The black matrix 128 is formed at boundaries of the pixel regions. In other words, the black matrix 128 on the second substrate 120 corresponds to the gate lines 101, the data lines 103, and the TFT, thereby preventing a light leakage at the time of displaying a normally black mode.

The organic pattern 123 having a rib structure of the black matrix 128 can be formed by using a negative photoresist. More specifically, the negative photoresist is deposited on the second substrate 120, and then is patterned so as to have a line width of less than about 10 μm and to have a triangular rib structure. The triangular rib structure of the organic pattern 123 is then coated with a reflective layer 125. The black matrix 128 with the reflective layer 125 prevents light leakage, and at the same time, reflects light incident thereon from a backlight (not shown) into the pixel region(the arrow direction in drawing).

Figure 3A:
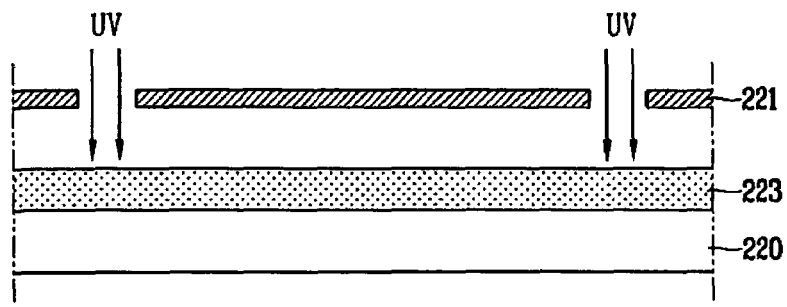
FIGS. 3A and 3D are cross-sectional views showing processes for fabricating a color filter substrate according to an embodiment of the present invention.
Figure 3B:
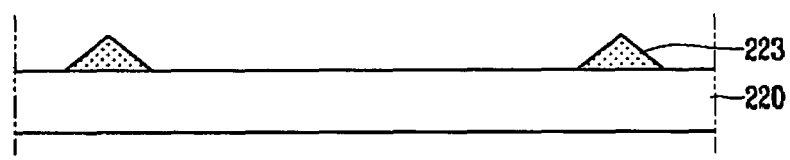
Figure 3C:
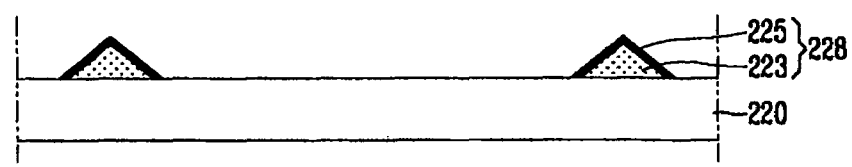
Figure 3D:
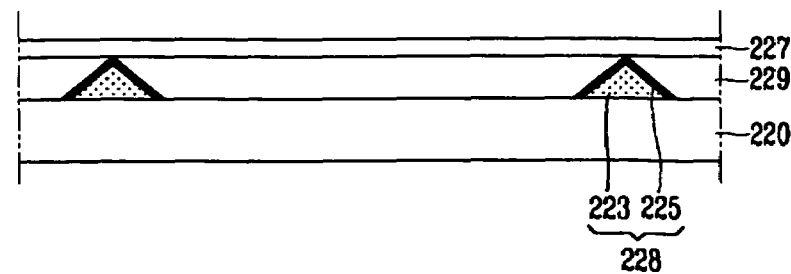

FIGS. 3A and 3D are cross-sectional views showing processes for fabricating a color filter substrate according to an embodiment of the present invention. As shown in FIG. 3A, a negative photoresist layer 223' is deposited on the transparent substrate 220. Then, ultraviolet rays are irradiated onto the negative photoresist layer 223' by using a mask 221 having transmission openings aligned with regions to be patterned on the negative photoresist layer 223'. Then, the negative photoresist layer 223' onto which ultraviolet rays have been selectively irradiated is developed, thereby forming an organic pattern 223 having a triangular rib structure at the regions on which ultraviolet rays have been irradiated.

As shown in FIG. 3B, the organic pattern 223 has a rib structure instead of a flat structure because the organic pattern 223 has a width less than 10 μm. Generally, a photoresist pattern is formed using a mask having a tapered interface. Thus, when the photoresist pattern has a width of about less than 10 μm, both sides of the resultant pattern will have a tapered rib structure or triangular rib structure.

Next, a metal layer having excellent reflectivity, such as Al or AlNd, is deposited over the entire surface of the transparent substrate 220 including the organic pattern 223, and then patterned. As shown in FIG. 3C, a reflection layer 225 is formed on the surfaces of the organic pattern 223, thereby forming a black matrix 228 including the organic pattern 223 and the reflection layer 225.

As shown in FIG. 3D, a color filter layer 229 of R, G, and B is formed on the transparent substrate 220 on which the black matrix 228 is formed. Then, a transparent conductive material, such as indium tin oxide (ITO) or indium zinc oxide (IZO), is deposited on the color filter layer 220 to form a common electrode 227.

As aforementioned, an embodiment of the present invention provide an LCD device capable of enhancing a brightness by having a black matrix that reflects light back into the pixel regions, and a method for fabricating the same. The present invention is not limited to a twisted nematic structure. That is, the present invention can be also applied to an IPS-LCD device that a common electrode and a pixel electrode are formed on the same substrate. The black matrix can be formed to have a rib shape that is symmetrical with a reflection layer on a surface of the black matrix. Accordingly, light incident onto the black matrix from a backlight is reflected to adjacent pixel regions, and then the reflected light is re-reflected by a polarizer so as to increase the overall brightness of the LCD device. Since the overall brightness is increased, the contrast ratio of the LCD device is enhanced, which improves picture quality. Further, light utilization from the backlight increases by using light that otherwise would be absorbed by a black matrix.

It will be apparent to those skilled in the art that various modifications and variations can be made in the liquid crystal display device and a method for fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate and a second substrate;
   gate lines and data line perpendicularly disposed from each other on the first substrate to define a plurality of pixel regions;
   a switching device formed at each pixel region
   a black matrix formed on the second substrate, the black matrix including a reflection layer on a surface thereof;
   a color filter formed on the black matrix; end
   a liquid crystal layer formed between the first substrate and the second substrate;
   a reflective polarizer at an outside surface of the first substrate; and
   a backlight at the outside of the first substrate to supply light to the liquid crystal layer,
   wherein the light supplied to the liquid crystal layer from the backlight is reflected from the reflection layer of the black matrix and then re-reflected from the reflective polarizer to the pixel regions.

2. The liquid crystal display device of claim 1, wherein the reflection layer is on a side of the black matrix facing the first substrate.

3. The liquid crystal display device of claim 1, wherein the reflection layer is on a side of the black matrix that is linear.

4. The liquid crystal display device of claim 1, wherein the black matrix has a triangular rib shape.

5. The liquid crystal display device of claim 4, wherein the reflection layer is on sides of the triangular rib shape of the black matrix facing the first substrate.

6. The liquid crystal display device of claim 1, further comprising: pixel electrodes formed in pixel regions defined by crossing the gate lines and data lines on the first substrate; and
   a common electrode formed on an entire surface of the color filter of the second substrate.

7. The liquid crystal display device of claim 1, further comprising common electrodes and a pixel electrodes in pixel regions defined by crossing the gate lines and data lines on the first substrate.

8. A method for fabricating an liquid crystal display device, comprising:
   providing a first substrate having a thin film transistor array with pixel regions;
   providing a second substrate on which a black matrix and a color filter are formed, the black matrix arranged on the second substrate in horizontal and vertical directions along boundaries of the pixel regions, and includes a reflection layer on a surface thereof facing the second substrate;
   forming a liquid crystal layer between the first substrate and the second substrate;
   providing a reflective polarizer at an outside surface of the first substrate; and
   providing a backlight at the outside of the first substrate to supply light to the liquid crystal layer,
   wherein the light supplied to the liquid crystal layer from the backlight is reflected from the reflection layer of the black matrix and then re-reflected from the reflective polarizer to the pixel regions.

9. The method of claim 8, wherein the providing the second substrate includes:
   providing a transparent substrate;
   forming an organic pattern having a triangular structure on the transparent substrate;
   forming a reflection layer on a surface of the organic pattern; and
   forming a color filter layer on the transparent substrate.

10. The method of claim 9, further comprising forming a common electrode on the color filter layer.

* * * * *